March 15, 1938.  G. A. KOHOUT  2,110,977

FUEL FEEDING CONTROL DEVICE FOR FURNACES

Filed Sept. 25, 1933   7 Sheets-Sheet 1

Inventor
George A. Kohout
By: Zabel & Wells Attys.

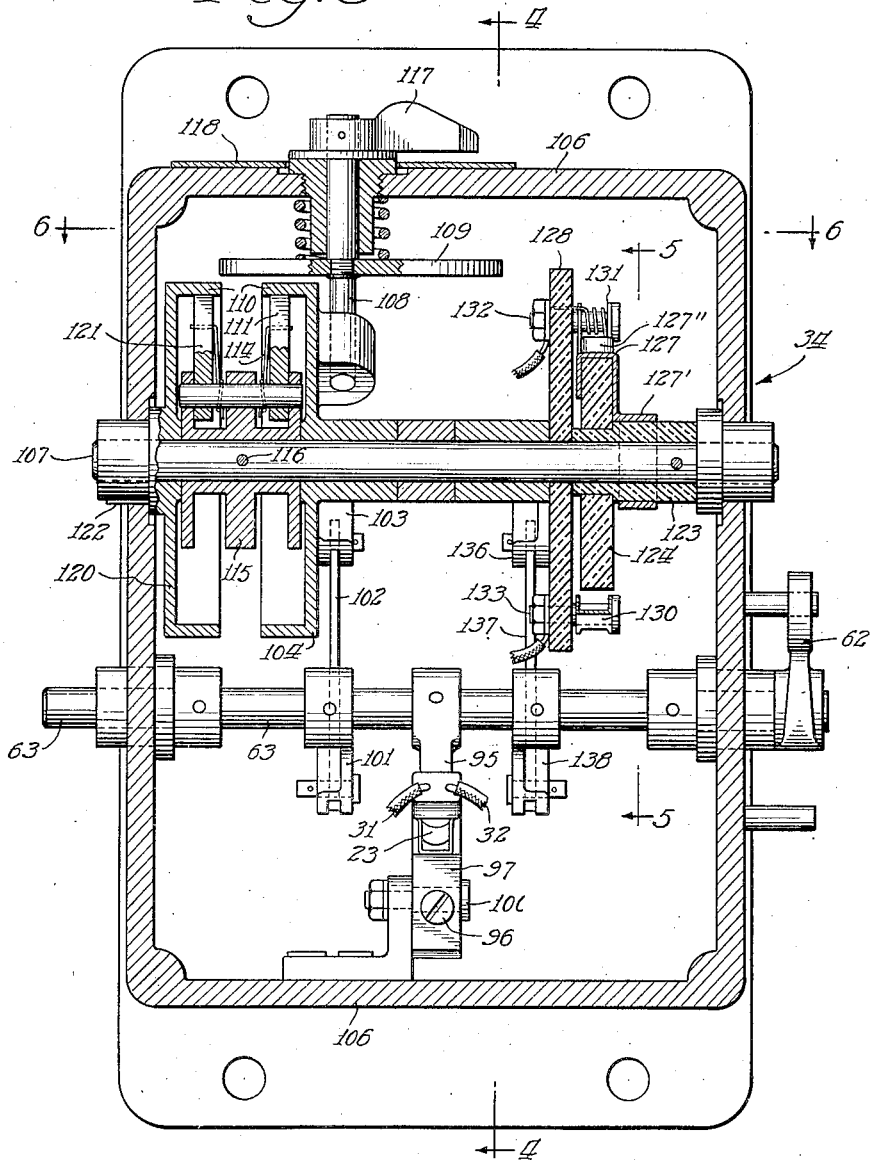

March 15, 1938. G. A. KOHOUT 2,110,977
FUEL FEEDING CONTROL DEVICE FOR FURNACES
Filed Sept. 25, 1933 7 Sheets-Sheet 3

Inventor
George A. Kohout
By: Zabel & Wells
Attys

March 15, 1938.  G. A. KOHOUT  2,110,977
FUEL FEEDING CONTROL DEVICE FOR FURNACES
Filed Sept. 25, 1933  7 Sheets-Sheet 4

Inventor
George A. Kohout
By: Zabel & Wells
Attys.

March 15, 1938.  G. A. KOHOUT  2,110,977
FUEL FEEDING CONTROL DEVICE FOR FURNACES
Filed Sept. 25, 1933  7 Sheets-Sheet 5
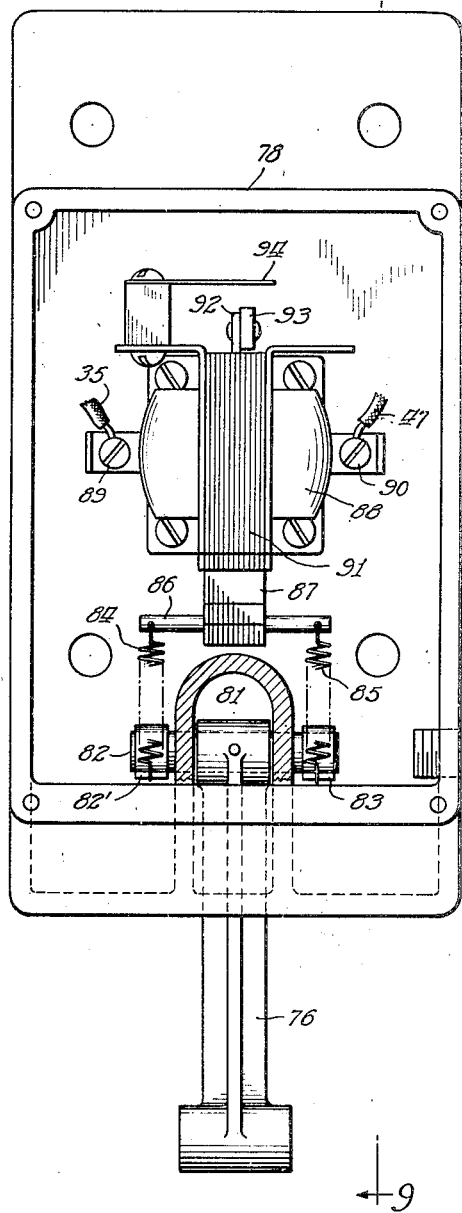
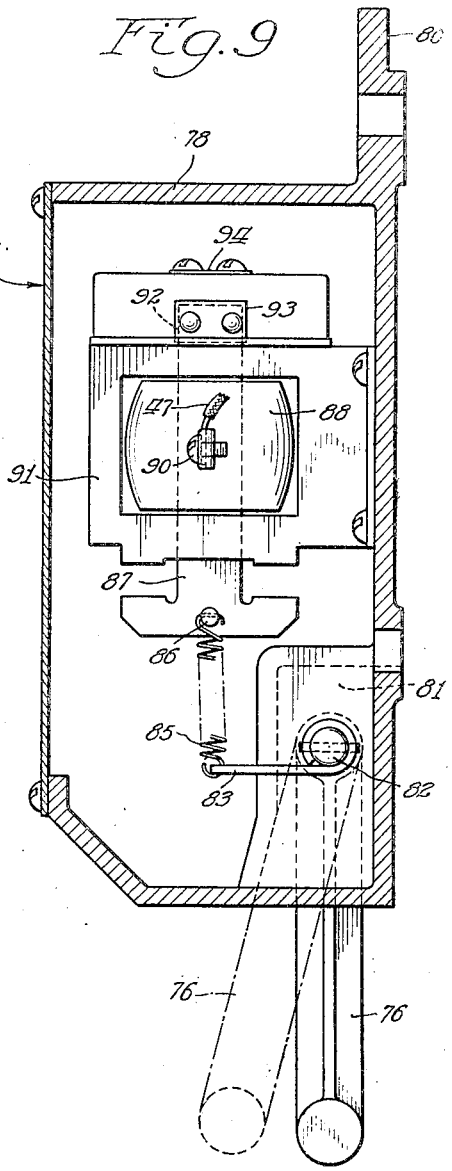
Inventor
George A. Kohout
By: Fabel & Wells
Attys

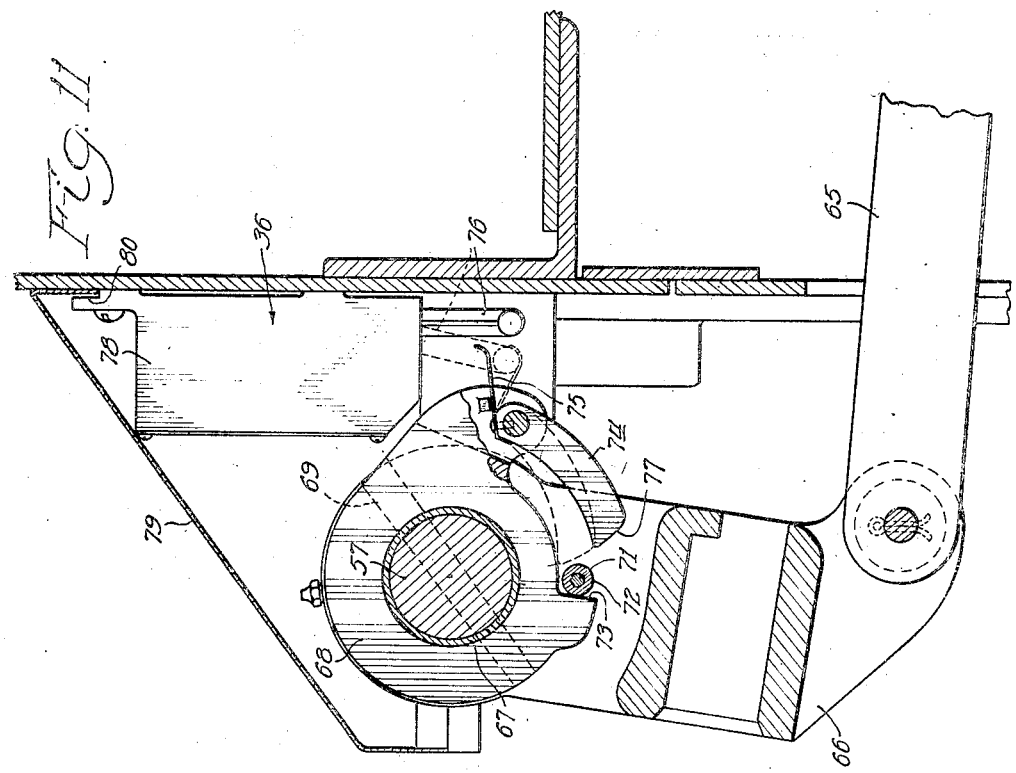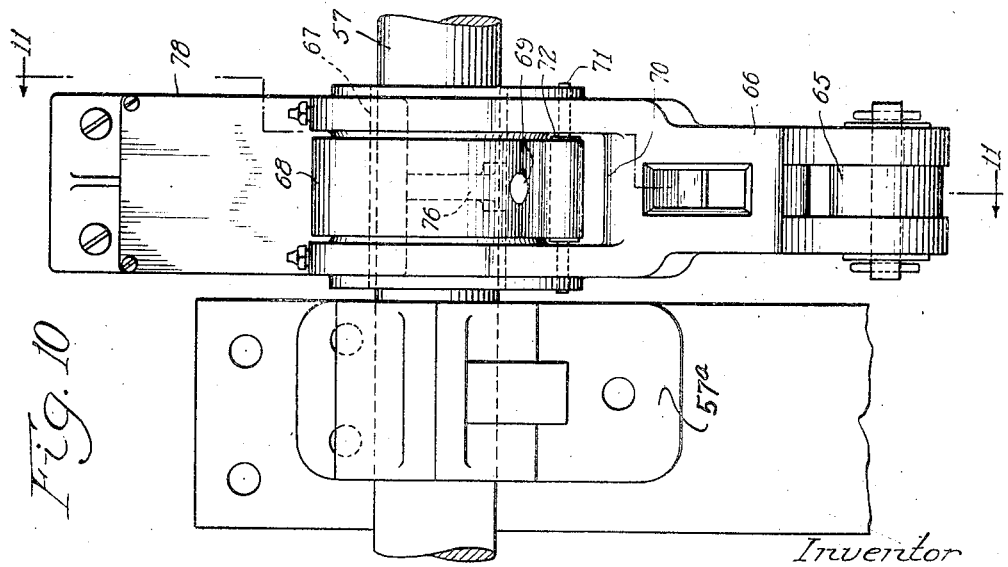

March 15, 1938.                 G. A. KOHOUT                2,110,977
                   FUEL FEEDING CONTROL DEVICE FOR FURNACES
                    Filed Sept. 25, 1933        7 Sheets-Sheet 7

Fig. 12

Inventor
George A. Kohout
By:
Zabel & Wells
Attys

Patented Mar. 15, 1938

2,110,977

UNITED STATES PATENT OFFICE 2,110,977

FUEL FEEDING CONTROL DEVICE FOR FURNACES

George A. Kohout, Chicago, Ill.

Application September 25, 1933, Serial No. 690,797

7 Claims. (Cl. 126—169)

My invention relates to furnaces and more particularly to a control system for providing flexible supervisory control of automatically operated furnaces.

In furnaces in which the feeding of fuel is automatically stopped or started in response to changes in boiler pressure, furnace temperature, lapse of time or other control factors, the problems of controlling the rate of feeding while the feeding mechanism is in operation and the time sequence of operating the different units of a multiple unit feeding mechanism present certain difficulties.

It is a purpose of this invention to provide a control system which may be used in conjunction with automatic furnace controls to adequately regulate the rate of fuel feeding during the period of operation of the fuel feeding mechanism.

It is also a purpose of my invention to provide in a multiple unit fuel feeding system a novel control means for maintaining a definite time sequence of operation of said units which also makes possible independent operation of any unit at any time.

My invention contemplates also the provision of a novel control mechanism for controlling the length of time interval separating the actuations of the fuel feeding units.

Other and more specific objects of the invention will appear as the description proceeds in connection with the accompanying drawings. It is to be understood, however, that the drawings and description are illustrative only and are not to be taken as limiting the invention except in so far as it is limited by the claims.

In the drawings—

Fig. 3 is a vertical section through a part of the control mechanism employed;

Fig. 8 is a front view with the cover removed of one of the solenoid units for connecting the drive shaft to the various fuel feeding units;

Fig. 9 is a section on the line 9—9 of Fig. 8;

Fig. 10 is a front view of a portion of the drive shaft and the mechanism for conecting it to the grate actuating mechanism;

Fig. 11 is a section on the line 11—11 of Fig. 10; and

Fig. 12 is a diagrammatic view illustrating the electrical connections to the various control elements for operating the fuel feeding units.

Figure 2:
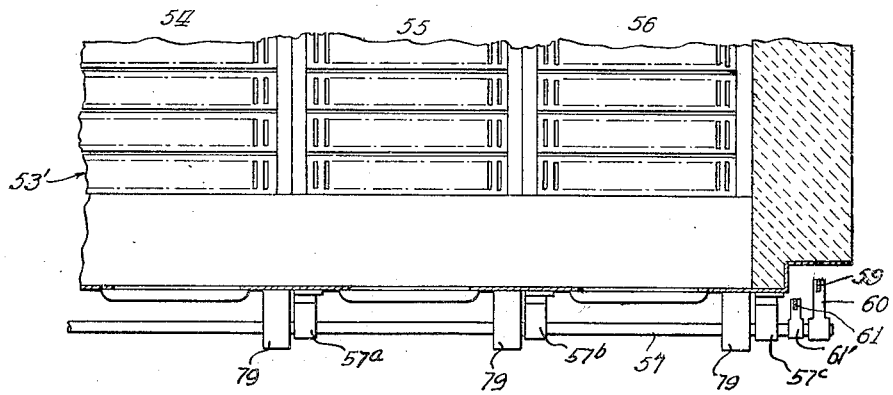
Fig. 2 is a sectional view substantially on the line 2—2 of Fig. 1 showing the multiple fuel feeding units or stoker grates.

In illustrating my invention, I have applied it to a furnace where the fuel is fed down over the grates from the inlet by means of a series of stoker grate units in which the grate bars are rocked upon their pivots to move the fuel away from the entrance. In fuel feeding devices of this character, it is common to employ the control mechanism for stopping and starting the fuel feeding motor in response to changes in boiler pressure, and I have shown diagrammatically in Fig. 12 the wiring connections necessary for this purpose. I have also shown suitable connections to a timing switch operating in connection with the pressure switch for stopping and starting the fuel feeding motor at intervals when the pressure switch is open. In utilizing stoker grates of the rocking grate type, it is also essential that when the fuel feeding mechanism is stopped, the grates be left in level position, and this is accomplished by utilizing a limit switch which maintains the motor circuit closed after the pressure switch or the time switch has opened until the grates reach a level position. Such a structure is shown in my prior Patent No. 1,897,579.

My invention is directed to a device operating in conjunction with or independently of the control mechanism above referred to to connect and disconnect the drive shaft to the several feeding units.

In order that the general operation of the control mechanism may be properly understood, I will first describe the control circuits shown in Fig. 12.

Referring now to Fig. 12, the letters A, B, and C indicate the current supply lines from a three-phase source for operating the mechanism. These lines are brought in to a terminal board 10 and connected to the line terminals L1, L2, and L3. This board carries a relay 11 which is adapted when energized to close the contacts at 12, 13, and 14 for energizing the motor. When contact 12 is closed, line A is connected through terminal L1, contact 12, winding of safety coil 15 to the motor 16. When contact 13 is closed, line B is connected through terminal L2 and contacts 13 to motor 16; and, when contact 14 is closed, line C is connected through terminal L3, contacts 14, and winding of the safety coil 17 to the motor. Since contacts 12, 13, and 14 are all closed by energization of relay 11, it is evident that when this relay is energized the motor will be started; and, if for any reason the relay is deenergized, the motor will be stopped.

The safety devices 15 and 17 normally connect the terminals at 18 and 19 in the line which leads to the relay 11. These safety devices 15 and 17 are merely overload relays which open their contacts when an excessive amount of current is being drawn by the motor 16.

The terminal L1 is connected through the contacts 18 to the relay 11, and the other side of the relay is connected through the contacts 19 to terminal C1 which is directly connected to terminal C2. The hand switch 20, which is a three-position switch is connected directly to terminal L3. It is evident that, if hand switch 20 is moved to connect with its upper contact, an energizing circuit for relay 11 is immediately closed from line A through terminal L1, contacts 18, winding of relay 11, contacts 19, terminals C1 and C2, upper contact of switch 20, terminal L3 to line C. This would, of course, close contacts 12, 13, and 14 and energize the motor so that the operator may, at any time he desires by moving the hand switch 20 to its upper position energize the motor 16.

Now if the hand switch 20 is moved to its lower contact, line C is connected through terminal L3, hand switch 20 to contact C3. The contacts of pressure switch 21, time switch 22 and limit switch 23 are connected in parallel across contacts C2 and C3. Lines 24 and 25 lead from C3 and C2 respectively to the terminals of the pressure switch 21. Lines 27 and 28 connect the opposite terminals of time switch 22 to terminals C3 and C2, respectively. The time switch is also shown with the usual energizing coil 29 which is connected on one side by the line 30 to terminal L1 and on the other side through the line 27, switch 20, to terminal L3 when the switch 20 is in lower position so as to maintain the clock mechanism of time switch 29 properly energized.

The limit switch 23 is connnected to terminal C3 by line 31 and to terminal C1 by line 32, C1 being directly connected to terminal C2. This places the limit switch in parallel with the pressure switch and the time switch across the terminals C2 and C3.

Now if the hand switch 20 is in lowermost position, this connects line C through terminal L3 and switch 20 to terminal C3. Line A is already connected to terminal C2 through terminal L1, contacts 18, relay 11, contacts 19, and terminal C1. Therefore, if either switch 21, 22, or 23 is closed, a circuit for energizing the relay 11 will be completed when the switch 20 is in its lowermost position. It is evident, therefore, that the motor may be started by the closing of the pressure switch 21 assuming that the hand switch 20 is in its lower position, and, if pressure switch 21 is maintained open, the periodical closing of switch 22 will also energize relay 11.

The limit switch 23, as will be brought out later, is only open when the stoker grates are in level position. The grates are, therefore, stopped in level position, and limit switch 23 cannot start the motor 16 from this position. However, if the motor is operating and both switches 21 and 22 are open, the limit switch 23 will maintain the motor energized until it moves the grates to level position and breaks the circuit at limit switch 23 to deenergize relay 11.

The controls just described are not in themselves the novelty of the present application, and I will now describe the operation of the circuit which controls the actuation of the stoker grates after the motor 16 has been energized.

As shown in Fig. 12, line A is connected through terminal L1, contacts 12 and winding of safety device 15 to line 33. Line 33 leads to terminal S1 of the supervisory control device 34. Line 32 connects to terminal S3 on the panel of the control device 34, and this terminal in turn is connected by line 35 to one side of each of the solenoids 36, 37, and 38. For the purpose of clarity, I will describe the circuit controlling the solenoids 36, 37, and 38 with the assumption that the hand switch 20 is on its upper contact to energize the motor 16. This places line C in direct connection with terminal C1 and C2. 39 indicates a rotary cam switch which is directly connected by line 40 to terminal S1 and line 33 which is in turn connected to line A when the motor is energized. The cam switch 39 has three contacts 41, 42, and 43 which connect through the hand switches 44, 45, and 46, respectively, to terminals S4, S5, and S6, which are in turn connected by lines 47, 48, and 49 to the solenoids 36, 37, and 38, respectively.

Thus, if the contact 40' of the cam switch 39 engages contact 41, then switch 44, which is normally closed, will direct current from line A through terminal L1, contact 12 of relay 11, winding of safety device 15, line 33, terminal S1, line 40, contacts 40', and 41, switch 44, terminal S4, line 47 to solenoid 36; and then over a return circuit through line 35, terminal S3, line 32 to terminal C1, then to terminal C2 and through switch 20 and terminal L3 to line C. Solenoid 36 will thus be energized.

Over similar paths solenoid 37 will be energized when contact 40' engages contact 42 and switch 45 is closed, and solenoid 38 will be energized when contact 40' engages contact 43 and switch 46 is closed.

I have also shown push button switches 50, 51, and 52 connected directly on one side to line 40 and on the other side to terminals S4, S5, and S6 so that by manually closing switch 50 for example when the motor 16 is running the solenoid 36 may be operated even though contact 40' is not in engagement with contact 41.

The circuit over which solenoid 36 is energized by closure of switch 50 leads from line A through terminal L1, contacts 12 of relay 11, winding of safety device 15, line 33, terminal S1, line 40, branch line 53, closed contact of switch 50 to terminal S4, line 47, winding of solenoid 36, and back over lines 35 and 32 through terminals C1, C2, and switch 20 to terminal L3 and line C.

Now if the automatic control devices such as pressure switch 21 and time switch 22 are in circuit, there is really no difference in the operation of the devices 36, 37, and 38 as in this case, so long as either pressure switch 21, time switch 22, or limit switch 23 happen to be closed and 20 is in its lower position, the energizing circuit for element 36 will extend from line A over the path previously described to line 33, then through the control 34 to terminal S4 and line 47 and back over line 35 and 32 to terminal C1 and from terminal C1 to terminal C2. The circuit is completed from terminal C2 in case pressure switch 21 is closed over line 25, contacts of pressure switch 21, line 24, terminal C3 to switch 20 at its lower contact which connects up line C to complete the energizing circuit for 36. Similarly, if the time switch 22 is closed, the energizing circuit for 36 will be closed through the lines 27 and 28 and the closed contacts of time switch 22.

When the limit switch 23 is closed and the other two switches are open, the energizing circuit for 36 may be traced over the following path: From line A, through terminal L1, contacts 12 of relay 11, winding of safety device 15, line 33 to terminal S1 of control device 34, then through the control device 34 to terminal S4, line 47 to 36, back over line 35 to terminal S3, then through closed contact of limit switch 23 to terminal S2 and over line 31 to terminal C3 and then to switch 20 at its lower contact back to terminal L3 and line C.

The manner in which the solenoid devices 36, 37, and 38 may be periodically energized by the cam switch device 39 at any time the motor 16 is running will, it is believed, be clear from the above description. Also, it is believed to be evident that any time the motor 16 is running, either of the devices 36, 37, or 38 may be energized by pressing the corresponding push button 50, 51, or 52.

I will now describe the mechanism which is caused to be operated by the energization of the elements 36, 37, and 38.

I have shown my invention as applied to a fuel feeding device utilizing stoker grates of the rocking type. These grates are indicated by the numeral 53' (see Fig. 2) and there are three sections or units such as 54, 55, and 56 all of which are operated from a common drive shaft 57 which in turn is driven from motor 16 by means of a disc and crank pin 58, link 59. and arm 60. Suitable bearings 57a, 57b, and 57c are provided for the shaft 57. In addition, a link 61 connects a second arm 61' fixed on the shaft 57 to a similar arm 62 mounted on the shaft 63 which drives the cam switch 39. The connections between the shaft 57 and the three fuel feeding units 54, 55, and 56 are the same for each unit. These connections are shown most clearly by Figures 1, 10, and 11. The rocking grate bars are connected by depending arms such as 64 to the actuating link 65 which in turn is secured to the arm 66 which is pivotally mounted upon the shaft 57. A suitable sleeve bearing 67 serves to take the wear of the arm 66 off the shaft 57. This sleeve bearing is secured to the member 68 which is in turn carried by the shaft 57 and secured thereto by suitable pin 69 so as to rock with the shaft.

The member 66, it will be noted, is forked at 70 to provide two arms which fit on opposite sides of the member 68, and a shear pin 71 carries a roller 72 between the two arms. The member 68 has the shoulder 73 thereon which is adapted to engage the roller when the member 68 and shaft 57 are rocked in a counterclockwise direction so as to force the roller 72 and with it the arm 66 to move with the shaft in this direction. Opposite the shoulder 73 the member 68 has pivoted thereto a pawl 74 which in its normal inoperative position swings down by its own weight into the position shown in full lines in Fig. 11. The position shown in Fig. 11 is that of resting position for the fuel feeding grates, and it is believed to be evident that, if the shaft 57 and member 68 are rocked in a clockwise direction from this position, the roller 72 will ride between the member 68 and the pawl 74.

Now, if the pawl 74 is raised up into the dotted line position shown in Fig. 11, the same rotation will cause the end of this pawl to engage the roller 72 and thus move the arm 66 with the shaft 57 thus rocking the grates 53 to cause a fuel feeding operation. It should be understood, of course, that each of the fuel feeding units 54, 55, and 56 is connected to shaft 57 by mechanism like that shown in Figs. 10 and 11.

The pawl 74 has the heavy spring extension 75 projecting toward the furnace, and this extension is adapted to be engaged by the depending arm 76 depending from the solenoid device 36. When the solenoid device 36 is energized, it rocks the arm 76 from the full line position shown in Fig. 11 to the dotted line position shown in this figure. The extension 75 then, when the shaft 57 is returning in a counter-clockwise direction to the position shown in Fig. 11, will be caught by the end of the arm 76 to move the pawl 74 up into the dotted line position shown in Fig. 11, and thus cause the pawl to engage the roller 72. It will be noted that the end face 77 of pawl 74 is so shaped that once it is pressed against the roller 72 and held there by the force necessary to turn the arm 66, it cannot fall out until the pressure is released or until the clockwise stroke of the shaft 57 is completed. The energizing of the solenoid devices such as 36 is so timed with respect to the rocking of shaft 57 that the arm 76 is swung into its dotted line position while the spring member 75 is out of the way. This timing operation will be brought out more clearly after the mechanism has been fully described. Of course, if the arm 76 is caused by hand operation of push button switches such as 50 to 52 to move toward the member 75 when the member 75 is in the full line position shown in Fig. 11, nothing will happen until the shaft 57 has swung far enough to bring 75 below the end of the arm 76.

From the above description, it is believed to be evident that when the solenoid device 36 is energized to swing arm 76 out into the path of the spring 75, the pawl 74 will serve to connect the arm 66 to the shaft 57 for rotation with the shaft in a clockwise direction; and naturally the rotation in the opposite direction will, through the medium of the roller 72 and the shoulder 73, bring the arm 66 back to the position shown in Fig. 11 on the return stroke.

The manner in which solenoid device 36 moves the arm 76 will now be described.

Referring to Figs. 8 and 9, the solenoid device 36 is housed in a casing 78 which is suitably mounted on a furnace as shown in Fig. 11, and further to protect the solenoid device from the dust and dirt around a furnace, a cover or housing 79 hooks into the notch at 80 (see Fig. 11) at the top of the casing 78 between the mounting lug of the casing and the furnace wall. This housing projects out over the device 68 mounted on the shaft 57 and thus keeps the falling material such as particles of coal and the like from disturbing the operating mechanism. The lower end of the casing 78 has the recess 81 cast therein, and the arm 76 extends up into this recess where it is mounted upon shaft 82 that projects through the walls of the recess 81, and is provided at its opposite ends with the arms 82' and 83. These arms are connected by the coil springs 84 and 85 to the pin 86 which passes through the lower end of the solenoid plunger 87. The coil 88 is energized over the wires 35 and 47 connected to the terminals such as 89 and 90. The numeral 91 indicates the laminated frame of the solenoid, and the numeral 92 indicates an extension from the upper end of the plunger 87 which carries a stop piece 93 of non-magnetic material to engage the spring 94 when the solenoid plunger is raised upon energizing of the coil 88. The purpose of the spring 94 is, of course, to insure release of the plunger and its downward movement when the energizing circuit of the solenoid is broken as otherwise the residual magnetism of the laminations 91 and the plunger 87 might hold the plunger in raised position. It is believed to be evident from an inspection of Figs. 8 and 9 that, when plunger 87 is raised, the arms 82' and 83 will swing the arm 76 into the dotted line position illustrated in Figs. 9 and 11 for engagement with the spring 75.

The manner in which the solenoid is energized has already been described in connection with Fig. 12.

I will now describe the mechanism of the control device 34.

Figure 1:
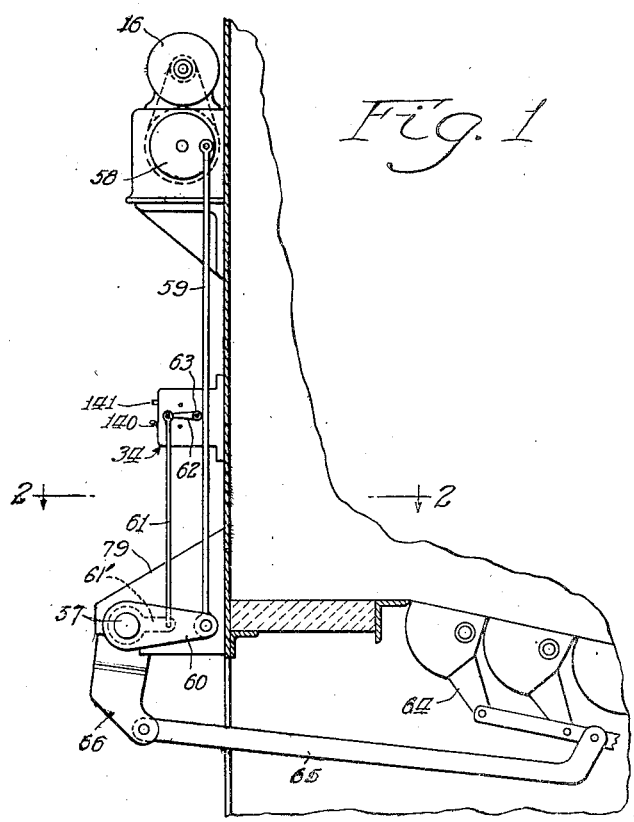
Fig. 1 is a side view partly in section illustrating a furnace of the stoker grate type to which my invention is applied.

Referring now to Figs. 3 to 7 inclusive, I have already described how the drive shaft 57 is connected through arm 61', link 61 and crank arm 62 to the driving shaft 63 for the control device 34. The drive shaft 63 has a depending arm 95 (see Fig. 4) which engages an adjusting screw 96 on the frame 97 that carries the limit switch 23. The limit switch 23, as shown, is a mercury switch in which the two contacts such as 98 and 99 are normally separated when the arm 95 is in the position shown in Fig. 4. This position of arm 95 corresponds to the raised position of the arm 62 which corresponds to the level grate position of arm 66 as shown by Figs. 1 and 11. In other words, the limit switch 23 is open when the grates are level. However, when the arm 95 is moved to the right from the position shown in Fig. 4 in response to a downward pull on arm 62, the weight of the frame 97 levels off the mercury switch 23 since the frame 97 can turn about its pivot at 100.

The shaft 63 has an arm 101 which is linked by means of link 102 to the arm 103 of the clutch device 104. Link 102 is slotted as indicated at 102' so that, while there is a downward movement of arm 103 in response to down movement of arm 101 to the limiting position shown in Fig. 4, the upward movement of arm 101 does not move arm 103 upward—the pin on arm 101 merely riding in the slot of link 102. A spring 105 connected at its one end to the housing 106 of the control device 34 and is connected under tension at its other end to arm 103 so that it tends to draw arm 103 upwardly at all times.

Clutch device 104 is mounted on shaft 107, but is free to rotate thereon. This clutch device has mounted thereon a pin 108 which engages with a cam 109 for adjusting the amount of rotation which will be transmitted to clutch device 104 for each movement of shaft 63 and arm 101. Within the flange 110 of clutch device 104, there are mounted a series of arms such as 111, 112, and 113 which are urged by means of the springs 114 outwardly against the flange 110, these arms being pivoted to a central member 115 that is secured to shaft 107 by pin 116. It will be noted that the arms such as 111 are slightly offset from radial position so that rotation of member 104 in a clockwise direction causes these clutch arms to engage or press against the flange 110 and thus rotate the central member 115 with the clutch member 104.

The shaping of the arms such as 111, 112, and 113 in order to obtain the proper clutching effect is one that involves considerable difficulty, and I have discovered that by making these arms in a certain fashion I can obtain a very effective one-way clutch action. The outer face of the arm such as 111 is curved on the same radius as the inner flange 110 so that the entire face may engage the flange. One edge of this end face of the arm is shorter than the other and the length of the arm must be such as to permit the short edge to approach as closely as possible to the intersection of a radial line through the pivotal axis of the rim 110 and the pivotal axis of the arm with the rim. In the figure I show the short edge as not quite reaching such intersection as allowance must be made for inaccuracies. This permits the full end face of the arm to engage the rim. If the arm is too short then it sticks and won't release, if too long it won't grip and slides on the rim. Since the bearing between the rim and end of the arm is quite large it is slow to wear and gives a long useful life. It appears necessary however to follow dimensions closely. For example, with the flange 110 made on a radius of one and one-fourth inches and the pivot of the arm 111 spaced one-half inch outwardly from the center of the shaft 107, the arm having a one-fourth inch face to engage the flange 110, the distance from the pivot center of the arm to the nearest end of the face of the arm that engages the flange 110 should be approximately one-sixteenth of an inch shorter than the distance from the pivot center to the other end of the face. With these proportions, I find that the clutch operates very smoothly in transmitting the rotary motion of the member 104 to the member 115 in one direction and releases easily to permit reverse rotation of the member 104 without turning the member 115.

Figure 4:
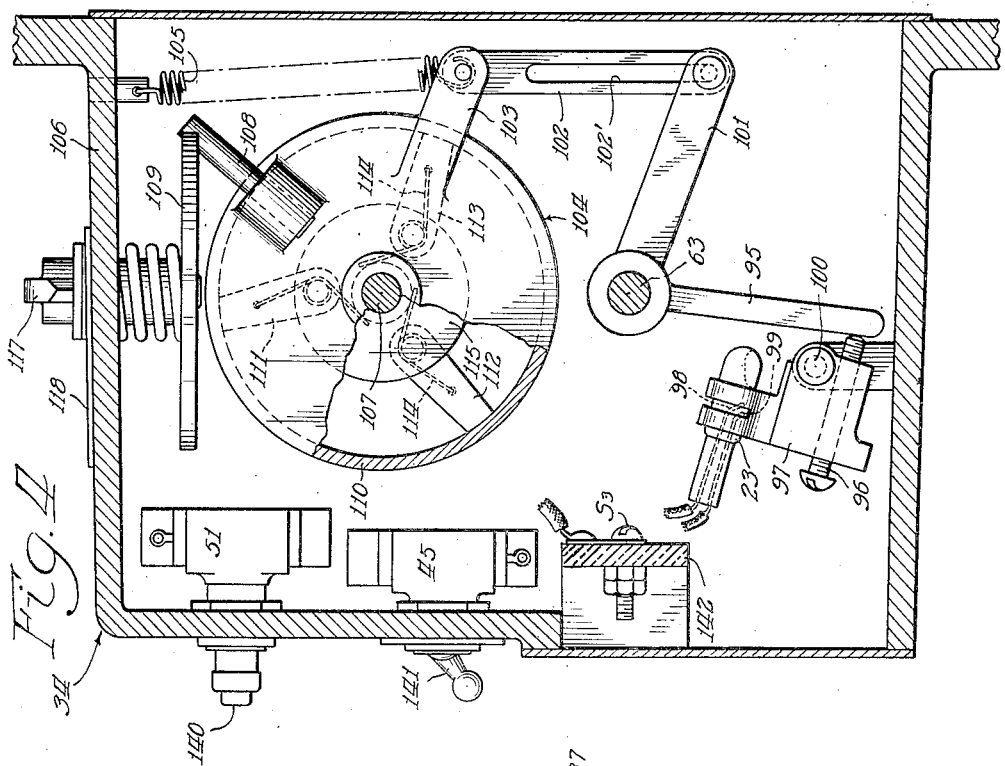
Fig. 4 is a section on the line 4—4 of Fig. 3.
Figure 7:
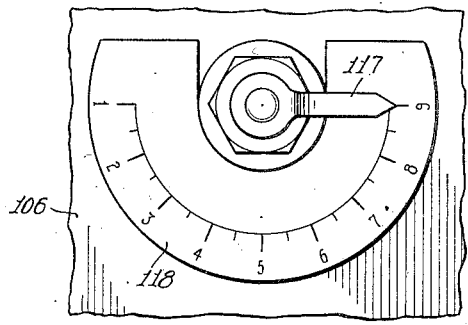
Fig. 7 is a top plan view of a portion of the top of the control box shown in Fig. 3 illustrating the control lever for setting the mechanism in the box of Fig. 3.

It is believed to be evident from an inspection of Fig. 4 that, when arm 62 is pulled down by the link 61, the spring 105 will be allowed to pull the arm 103 upwardly and to turn the member 104 in a counterclockwise direction. The pin 108 limits the amount of this motion, however, by striking against the cam surface on the plate 109. Then on the reverse stroke when the arm 62 is moved upwardly the arm 101 will move the disk 104 back down to limiting position, but the amount of movement of 104 will, of course, be only the amount which it was allowed to move in a counterclockwise direction by the pin 108 and cam 109. In this clockwise rotation of 104, the clutch arms cause the member 115 to rotate with 104. By turning the cam plate 109, by means of the finger piece 117, the amount of rotation of the member 115 for each rocking motion of the shaft 63 can be varied over a wide range. In this way, angular movement of shaft 107 step by step in one direction is accomplished. On the top of the casing 106 there is an indicating plate 118 which may be suitably marked as indicated in Fig. 7 for indicating the setting of the finger piece 117.

Referring now more particularly to Fig. 3, it will be noted that there is a second clutch disk 120 opposite the member 104 which is engaged by arms 121. The arms 121 are exact duplicates of arms such as 111, 112, and 113 and make the same angle with the radius through their pivots from the shaft 107 as arms 111, 112, and 113 do. Disk 120 is stationary, being keyed in the housing 106 as indicated at 122. The clutch arms 121 and disk 120, therefore, act to prevent rotation of 115 in a counterclockwise direction although permitting it to rotate freely in response to the force transmitted upon clutch device 104 through the arms 111, 112, and 113.

The motion of the shaft 107 is transmitted through the bushing 123 of insulating material which is pinned to the shaft 107 to a contact carrying disk 124 also of insulating material. This disk has the cut out notch at 125 (see Fig. 5) and the shoulder at 126 over which the contact member 127 is bent. The contact member 127 is integral with the sleeve 127' which is fixed on the bushing 123. The disk 128, also of insulating material, is rotatably mounted on shaft 107 and carries a series of spring pressed contacts 129, 130, and 131 which correspond to contacts 41, 42, and 43 shown in Fig. 12, the contact 127 corresponding to contact 40' of Fig. 12. Suitable terminals such as 132 and 133 are provided in conjunction with the contacts 129, 130, and 131 for connection to the wire leads shown in Fig. 12 as leading from contacts 41, 42 and 43. Disk 128 carries also an arm 134 in contact with the sleeve 127' which is also provided with a suitable terminal 135 for connection to the wire 40 of Fig. 12. Disk 128 has an arm 136 which is connected by link 137 to the arm 138 which is pinned to the shaft 63 so as to rock therewith. The disk 124 is moved by the shaft 107 step by step in a clockwise direction at a rate depending upon the setting of the cam 109, and, as it moves, the various contacts such as 129, 130, and 131 drop down onto the contact 127 to make circuit through the cam switching device from line 40 through terminal 135, arm 134, contact 127, and contact 129, 130, or 131 to the terminal 41, 42, or 43. The action of disks 124 and 128 will be best understood from Figures 3 and 5. Disk 128 rocks to and fro as shaft 63 rocks, and shaft 63 rocks in time with the rocking of shaft 57. Disk 124, however, is moved along by shaft 107 step by step in the direction indicated by the arrow in Fig. 5.

Figure 5:
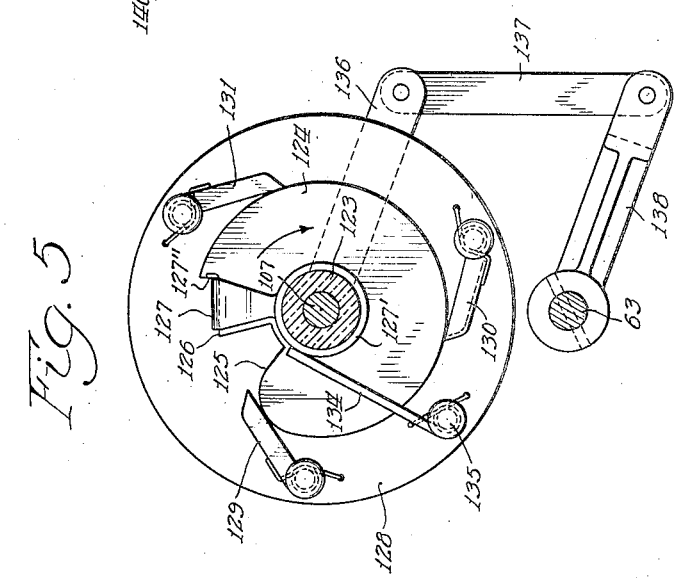
Fig. 5 is a section on the line 5—5 of Fig. 3.

The timing relation between shaft 57 and disk 128 will appear from Figs. 1, 4, and 5. When shaft 57 is moved clockwise, shaft 63 is moved counterclockwise in Figs. 1, 4, and 5, and disk 128 is, therefore, also moved counterclockwise.

The disk 124 is moved clockwise step by step during the clockwise movement of disk 128. On the counterclockwise movement of 128, or while shaft 57 is moving clockwise as shown in Figs. 1 and 11 to move spring 75 away from bar 76, the contact disk 124 is stationary. It is during this movement that the contacts 129, etc. drop down on 127 to energize the solenoids such as 36 thus swinging bar 76 at a time when the spring 75 is out of the way. During the next clockwise movement of disk 128, its contact such as 129 engages shoulder 127'' and moves cam disk 124 along with it for the full stroke of 128. The next or return stroke causes the contact such as 129 to drop off shoulder 126 into notch 125 to thus prevent that contact from engaging 127 again on the return stroke.

The maximum angular movement of disk 124 by drum 104 for one step is somewhat less than the angular rocking movement of disk 128, and the contact element 127 is made of substantial width in comparison with the distance disk 128 moves in order to insure contact on the advance movement of the contacts. For example, contact 127 is about equal in width to the distance it would move for an an angular movement of 30 degrees of disk 124. The maximum angular movement of disk 124 by drum 104 is about 30 degrees, and the angular movement of disk 128 is about 40 degrees.

Figure 6:
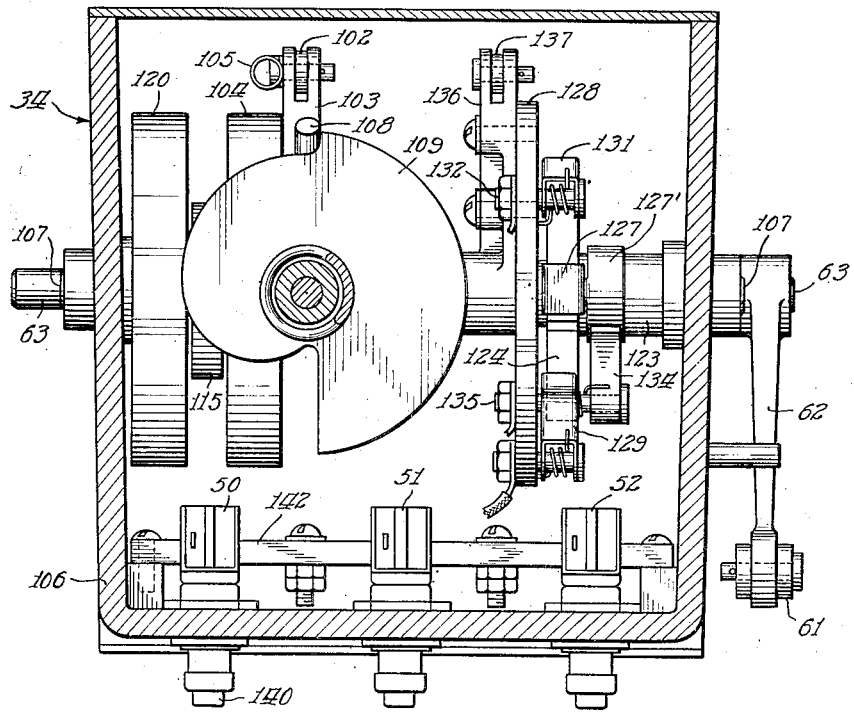
Fig. 6 is a section on the line 6—6 of Fig. 3.

50, 51, and 52 are ordinary commercial push button switches which are adapted to close circuit through them when the push buttons such as 140 are pressed. The switches 44, 45, and 46, only one of which is shown in Fig. 4 and which are hidden by the switches 50, 51, and 52 in Fig. 6, are also a standard commercial switch which are adapted to open and close their contacts in response to movement of the levers such as 141. Switch 44 and switch 50 are connected in the manner shown in Fig. 12, and this is also true of switches 45 and 51, and 46 and 52. The wiring is left off in the mechanical figures for the sake of clearness. The terminal strip 142 is the one on which the contacts S1, S2, etc. are mounted.

In order to make the operation of this device more clearly understood, I will assume that the time switch 22 is closed and the motor 16 is operating in accordance with the description given of the circuit in connection with Fig. 12. With the motor running, the crank 58, through the medium of the link 59 and arm 60, rocks the shaft 57; and also the rocking of shaft 57 through the arm 61' link 61 and arm 62 transmits a rocking motion to shaft 63. Rocking of shaft 63 causes arm 101 to move up and down. As arm 101 moves up, the spring 105 pulls arm 103 upwardly to rotate drum 104 in a counterclockwise direction until the pin 108 strikes the cam surface of cam plate 109. Further movement of the arm 101 merely causes this pin to move up in the slot 102' of link 102.

Now when the rocking motion is reversed and arm 101 is moved downwardly in response to a downward movement of arm 62 by link 61 and arm 61', the first part of the movement merely moves the pin on arm 101 to the bottom of slot 102'. When this point is reached, link 102 is pulled down which causes arm 103 to rotate the drum 104 in a clockwise direction as shown in Fig. 4. The clutch arms 111, 112, and 113 then grip the flange 110 and cause the member 115 to rotate in a clockwise direction thus rotating shaft 107 in the same direction, and shaft 107 carries with it the disk 124 and contact 127 mounted thereon. While this action is taking place, disk 128 is also being rocked in a clockwise direction by arm 136, link 137, and arm 138 which is mounted on shaft 63. This action will be continued until one of the contacts, say 131, drops down onto contact 127 during the counterclockwise rocking movement of 128 at which time a circuit will be completed from wire 40 through contact 40' which corresponds to arm 134 to contact 127 and then to contact 131 which corresponds to contact 43 to thus supply the current from line A over lines 33 and 40 up to the switch 46.

Assuming that switch 46 is closed, this connects line 49 in circuit so as to supply current to the solenoid device 38. Solenoid device 38 then attracts its armature or core 87 pulling it upward and causing the stop on 93 at the top thereof to strike spring 94 and at the same time the springs 84 and 85 are caused to rotate the shaft 82 to swing the connecting arm 76 from the full line position shown in Figs. 9 and 11 to its dotted line position. This positions the arm 76 to engage on top of the spring 75 on the return stroke of shaft 57 so as to move the pawl 74 up into dotted line position as shown in Fig. 11. Then as the shaft 57 is rocked in a clockwise direction as shown in Fig. 11, the pawl 74 engages roller 72 to move the arm 66 with the shaft, thus pulling the link 65 to the left to rock the grates upwardly and to feed the fuel forward on unit controlled by the solenoid device 38.

When the shaft 57 starts back in the opposite direction, that is when arm 60 is being pulled upwardly, arm 62 is also being moved upwardly, but prior to this on the clockwise stroke of shaft 57, arm 62 was pulled down which turned shaft 63 in a counterclockwise direction sufficiently to break the contact between 131 and 127 by pulling the tip of 131 off into the cut-out portion 125 of disk 124. This released solenoid device 38 and allowed its arm 76 to fall back into vertical position. The pawl 74, however, could not become disengaged owing to the shape of its end 77.

Going back now to the return or grate leveling stroke of the shaft 57, the upward movement of arm 60 and arm 62 by the motor causes the shoulder 73 on member 68 to engage roller 72 and the member 74 to drop down in idle position. The return stroke of the shaft, therefore, through the medium of shoulder 73 and roller 72, pushes the arm 66 back into the position shown in Fig. 11 thus to level the grates. During this stroke, arms 101 and 138 are pulled downward resulting in further advancing the member 115 through the medium of arm 103, disk 104, and clutch arms 111, 112, and 113, and this by rotating shaft 107 steps the disk 124 one step farther around in a clockwise direction. The stepping action would then continue until another contact such as 130 dropped onto contact 127 when the solenoid device 37 is energized to rock the grates controlled by it in the same fashion just described. In this manner, the different fuel feeding units are operated automatically in timed relation one after the other so long as the motor remains energized.

If at any time while the motor is energized the operator feels that one of the feeding units should be given an extra operation, he merely presses the push button such as 50, 51, or 52, mounted thereon, and this will energize a solenoid device 36, 37, or 38 directly from line A over line 33, line 40, and line 53 through the contacts of the closed switch 50, 51, or 52 and its associated line 47, 48, or 49. The actuation of the solenoid device will connect the shaft 57 to that particular feeding unit and operate it. The manual operation leaves the automatic operation undisturbed as to timing, and the automatic operation then continues in the fashion hereinbefore described.

From the above description, it is believed that the construction and operation of this device will be clear to those skilled in this art and the advantages thereof readily apparent.

Having thus described one specific form of my invention, what I claim as new and desire to secure by Letters Patent is:

1. In a furnace operating system, a drive member, a rocking grate, a grate rocking mechanism, and connecting means for connecting the drive member to said mechanism, control means for controlling the connecting means comprising an actuating member movable into position to cause the connecting means to connect the drive member to said mechanism, electro-magnetic means for operatively moving said actuating member, a cam switch driven from said drive member for periodically energizing said electro-magnetic means, and manually operable means to energize said electro-magnetic means between the energizations thereof by said cam switch.

2. In a furnace operating system, a drive member, a rocking grate, a grate rocking mechanism, and connecting means for connecting the drive member to said mechanism, control means for controlling the connecting means comprising an actuating member movable into position to cause the connecting means to connect the drive member to said mechanism, electro-magnetic means for operatively moving said actuating member, and a cam switch driven from said drive member for periodically energizing said electro-magnetic means.

3. In a control device for furnaces, a plurality of rocking grate units and a common drive member and individual connecting devices between each unit and said member normally maintaining the units disconnected from the drive member, electro-magnetic devices one for each unit each adapted when energized to cause the connecting device for that particular unit to couple the drive member to the unit, and control means for said electro-magnetic devices comprising a cam switch driven from said drive member and having contacts, and circuit connections connected with said contacts for energizing the electro-magnetic devices successively.

4. In a control device for furnaces, a plurality of rocking grate units and a common drive member and individual connecting devices between each unit and said member normally maintaining the units disconnected from the drive member, electro-magnetic devices one for each unit each adapted when energized to cause the connecting device for that particular unit to couple the drive member to the unit, and control means for said electro-magnetic devices comprising a cam switch driven from said drive member and having contacts, and circuit connections connected with said contacts for successively energizing the electro-magnetic devices, and manually operable switches for energizing said electro-magnetic devices.

5. In a control device for furnaces, a plurality of rocking grate units and a common drive member and individual connecting devices between each unit and said member normally maintaining the units disconnected from the drive member, electro-magnetic devices one for each unit each adapted when energized to cause the connecting device for that particular unit to couple the drive member to the unit, and control means for said electro-magnetic devices comprising a cam switch driven from said drive member and having contacts, and circuit connections connected with said contacts for successively energizing the electro-magnetic devices, said electro-magnetic devices each consisting of a solenoid, a pivoted arm, and resilient means connecting the solenoid and said arm for moving the arm into operating position when the solenoid is energized.

6. In a control device for furnaces, a plurality of rocking grate units and a common drive member and individual connecting devices between each unit and said member normally maintaining the units disconnected from the drive member, electro-magnetic devices one for each unit each adapted when energized to cause the connecting device for that particular unit to couple the drive member to the unit, and control means for said electro-magnetic devices comprising a cam switch driven from said drive member and having contacts, and circuit connections connected with said contacts for successively energizing the electro-magnetic devices, said control means having an adjusting device for varying the length of time between energizations of the electro-magnetic devices.

7. In a control device for furnaces, a plurality of rocking grate units and a common drive member and individual connecting devices between each unit and said member normally maintaining the units disconnected from the drive member, electro-magnetic devices one for each unit each adapted when energized to cause the connecting device for that particular unit to couple the drive member to the unit, and control means for said electro-magnetic devices comprising a cam switch driven from said drive member and having contacts, and circuit connections connected with said contacts for successively energizing the electro-magnetic devices, and manually operable switches in parallel with the cam switch contacts for energizing said electro-magnetic devices.

GEORGE A. KOHOUT.